(12) United States Patent
Jang et al.

(10) Patent No.: US 8,654,646 B2
(45) Date of Patent: Feb. 18, 2014

(54) METHOD AND APPARATUS FOR MANAGING FLOW INFORMATION IN A COMMUNICATION SYSTEM

(75) Inventors: Jae-Hyuk Jang, Seongnam-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 13/036,226

(22) Filed: Feb. 28, 2011

(65) Prior Publication Data

US 2011/0216652 A1   Sep. 8, 2011

(30) Foreign Application Priority Data

Mar. 2, 2010   (KR) .................. 10-2010-0018727

(51) Int. Cl.
*H04L 1/00*   (2006.01)
(52) U.S. Cl.
USPC ............ 370/236; 370/331; 709/225; 709/228
(58) Field of Classification Search
USPC ........................ 370/235, 236, 329; 455/427
See application file for complete search history.

(56) References Cited

U.S. PATENT DOCUMENTS

| | | | |
|---|---|---|---|
| 6,483,804 B1 * | 11/2002 | Muller et al. .................. | 370/230 |
| 2005/0215279 A1 | 9/2005 | Shim et al. | |
| 2005/0250499 A1 | 11/2005 | Lee et al. | |
| 2007/0211635 A1 * | 9/2007 | Hao et al. ....................... | 370/235 |
| 2009/0022054 A1 * | 1/2009 | Kim et al. ...................... | 370/235 |
| 2011/0281581 A1 * | 11/2011 | Brandt et al. .................. | 455/427 |
| 2011/0317665 A1 | 12/2011 | Jung et al. | |
| 2012/0064854 A1 * | 3/2012 | Youn et al. ................... | 455/404.1 |

FOREIGN PATENT DOCUMENTS

| | | |
|---|---|---|
| JP | 2007-525925 A | 9/2007 |
| JP | 2007-536786 A | 12/2007 |
| WO | 2010/098623 A2 | 9/2010 |

OTHER PUBLICATIONS

Altair Semiconductor, "Resolve DSx and HO interface issues", IEEE 802.16 Broadband Wireless Access Working Group, IEEE C802.16x-08/172, Apr. 16, 2008.

NextWave Wireless, "CID update enhancements", IEEE 802.16 Broadband Wireless Access Working Group, IEEE C802.16m-08/135r1, Apr. 19, 2008.

Motorola, "DSx continuity during handover", IEEE 802.16 Broadband Wireless Access Working Group, IEEE C802.16m-09/1381r2, Nov. 6, 2009.

(Continued)

*Primary Examiner* — Steven H Nguyen
*Assistant Examiner* — Henry Baron
(74) *Attorney, Agent, or Firm* — Jefferson IP Law, LLP (57) ABSTRACT

A method for managing flow information of a mobile station by a target base station in a communication system is provided. The method includes receiving a ranging request message, which includes a flow identifier for each of flows between a serving base station and the mobile station and a change count indicating the number of times of an addition/change/deletion operation of a corresponding flow for each of flow identifiers, from the mobile station; and transmitting a ranging response message, which includes a validity indicator indicating whether the change count of each of the flow identifiers is valid or not, to the mobile station, wherein, when the validity indicator indicates that at least one change count among change counts for each of the flow identifiers is not valid, the ranging response message includes a list including the at least one change count that is not valid.

14 Claims, 7 Drawing Sheets

(56) References Cited

OTHER PUBLICATIONS

Motorola, "Removed functionality about DSx transaction interrupted by HO causes problems (15.2.6.3.3)", IEEE 802.16 Broadband Wireless Access Working Group, IEEE C802.16m-09/2611, Nov. 6, 2009.

XP017604205; Part 16: Air Interlace for Broadband Wireless Access Systems, IEEE Standard for Local and Metropolitan Are Networks, IEEE Std 802.16-2009 (Revision of IEEE Std 802.16-2004), May 20, 2009.

S. Tzavidas et al., XP-002636251, Handover Enhancements, IEEE 802.16 Broadband Wireless Access Working Group, Nov. 13, 2009.

J. Jang et al., XP-002636250, DSx Status Synchronization After Network Reentry (16.2.6.3.5), EEE 802.16 Broadband Wireless Access Working Group, Mar. 5, 2010.

* cited by examiner

METHOD AND APPARATUS FOR MANAGING FLOW INFORMATION IN A COMMUNICATION SYSTEM

PRIORITY

This application claims the priority under 35 U.S.C. §119(a) of a Korean patent application filed in the Korean Intellectual Property Office on Mar. 2, 2010 and assigned Ser. No. 10-2010-0018727, the entire disclosure of which is hereby incorporated by reference.

BACKGROUND OF THE INVENTION

1. Field of the Invention

The present invention relates to a method and an apparatus for managing flow information between a base station and a mobile station in a communication system.

2. Description of the Related Art

In a communication system, in order to support various services, an advanced base station, or simply a Base Station (BS), manages a plurality of flows for each Mobile Station (MS). For example, when a certain MS desires simultaneously both voice communication and data services, such as the Internet, a BS allocates two flows respectively providing the voice communication and the Internet to the MS. A Quality of Service (QoS) for voice communication, such as a Voice over Internet Protocol (VoIP) QoS is allocated to one flow, while a different QoS for the Internet, such as a Best Effort (BE) QoS, is allocated to the other flow. In this case, each of the two flows includes a plurality of parameters according to the required QoS. The VoIP QoS has particular requirements with respect to delay. Therefore, parameters, such as uplink allocation period and uplink allocation size, are determined in the VoIP QoS. In contrast, since the BE QoS does not have particular requirements, the BE QoS does not include particular parameters. In the following description, parameters of each flow are called "flow information".

Flow information of each flow is dynamically managed by each of the MS and the BS. That is, new flow information may be added to a corresponding flow, parameters included in existing flow information of a corresponding flow may be changed, or the flow information of a corresponding flow may be deleted. The operation for an addition/change/deletion of the flow information, as described above frequently, occurs even while the MS is performing a communication within a service area of a serving BS.

Furthermore, even when the MS performs a handover from the serving BS to a target BS, the operation for the addition/change/deletion of the flow information occurs. In this case, if the addition/change/deletion of the flow information occurs while the MS performs a handover to a target BS, the flow information obtained as a result of the addition/change/deletion of the flow information may not be the same between the MS and the target BS. Consequently, communication between the MS and the target BS may be difficult or occur incorrectly.

SUMMARY OF THE INVENTION

An aspect of the present invention is to address the above-mentioned problems and or disadvantages and to provide at least the advantages described below. Accordingly, an aspect of the present invention is to provide a method and an apparatus for managing flow information between an MS and a BS in a communication system.

In accordance with an aspect of the present invention, a method for managing flow information of a mobile station by a target base station in a communication system is provided. The method includes receiving a ranging request message, which includes a flow identifier for each of flows between a serving base station and the mobile station and a change count indicating the number of times of an addition/change/deletion operation of a corresponding flow for each of flow identifiers, from the mobile station, and transmitting a ranging response message, which includes a validity indicator indicating whether the change count of each of the flow identifiers is valid or not, to the mobile station, wherein, when the validity indicator indicates that at least one change count among change counts for each of the flow identifiers is not valid, the ranging response message includes a list including the at least one change count that is not valid.

In accordance with another aspect of the present invention, a method for managing flow information by a mobile station in a communication system is provided. The method includes transmitting a ranging request message, which includes a flow identifier of each of flows connected to a serving base station and a change count indicating the number of times of an addition/change/deletion operation of a corresponding flow for each of flow identifiers, and receiving a ranging response message, which includes a validity indicator indicating whether the change count of each of the flow identifiers is valid or not, from a target base station, wherein, when the validity indicator indicates that at least one change count for each of the flow identifiers is not valid, the ranging response message includes a list including the at least one change count that is not valid.

In accordance with another aspect of the present invention, a target base station for managing flow information of a mobile station in a communication system is provided. The target base station includes a receiver for receiving a ranging request message, which includes a flow identifier for each of flows between a serving base station and the mobile station and a change count indicating the number of times an addition/change/deletion operation of a corresponding flow for each of flow identifiers, from the mobile station, and a transmitter for transmitting a ranging response message, which includes a validity indicator indicating whether the change count for each of the flow identifiers is valid or not, to the mobile station, and a controller for, when the validity indicator indicates that at least one change count among change counts for each of the flow identifiers is not valid, inserting a list including the at least one change count in the ranging response message.

In accordance with another aspect of the present invention, a mobile station for managing flow information in a communication system is provided. The mobile station includes a transmitter for transmitting a ranging request message, which includes a flow identifier for each of flows connected to a serving base station and a change count indicating a number of times of an addition/change/deletion operation of a corresponding flow for each of flow identifiers, to a target base station, and a receiver for receiving a ranging response message, which includes a validity indicator indicating whether the change count for each of flow identifiers is valid or not, from the target base station, wherein, when the validity indicator indicates that at least one change count for each of the flow identifiers is not valid, the ranging response message includes a list including the at least one change count that is not valid.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention proposes a method and an apparatus for managing flow information of flows between a Mobile Station (MS) and a Base Station (BS) in a communication system. Specifically, the present invention proposes a method and an apparatus for configuring a Flow Change Configuration Count (FCCC), which indicates a number of times of an operation for an addition/change/deletion of flow information has occurred for each flow, and managing the FCCC when the operation for the addition/change/deletion of flow information of each flow occurs between an MS and a BS.

Meanwhile, according to the present invention, when an MS performs a handover and makes an initial entry to a target BS, the MS or the target BS transmits an FCCC value or a sum of FCCC values of flow information for every flow of the MS or the target BS itself to its counterpart (i.e. the target BS or the MS, so that the state of the flow information of each corresponding flow currently held is exchanged between the MS and the target BS.

Thereafter, when the FCCC value or the sum of the FCCC values received by the MS or the target BS is different from the FCCC value or the sum of the FCCC values currently held by the MS or the target BS, the MS or the target BS transmits an FCCC Retrieve Request (FCR-REQ) message for making a request for identification of the state of the current FCCC value or the sum of the FCCC values to the counterpart (i.e. the target BS or the MS). Then, upon receiving the FCR-REQ message, the target BS or the MS transmits an FCCC Retrieve Response (FCR-RSP) message for the currently possessed FCCC value or sum of FCCC values to the MS or the target BS, thereby identifying flow information of discordant flow or flows and performing an addition/change/deletion of the discordant flow or flows.

Figure 1:
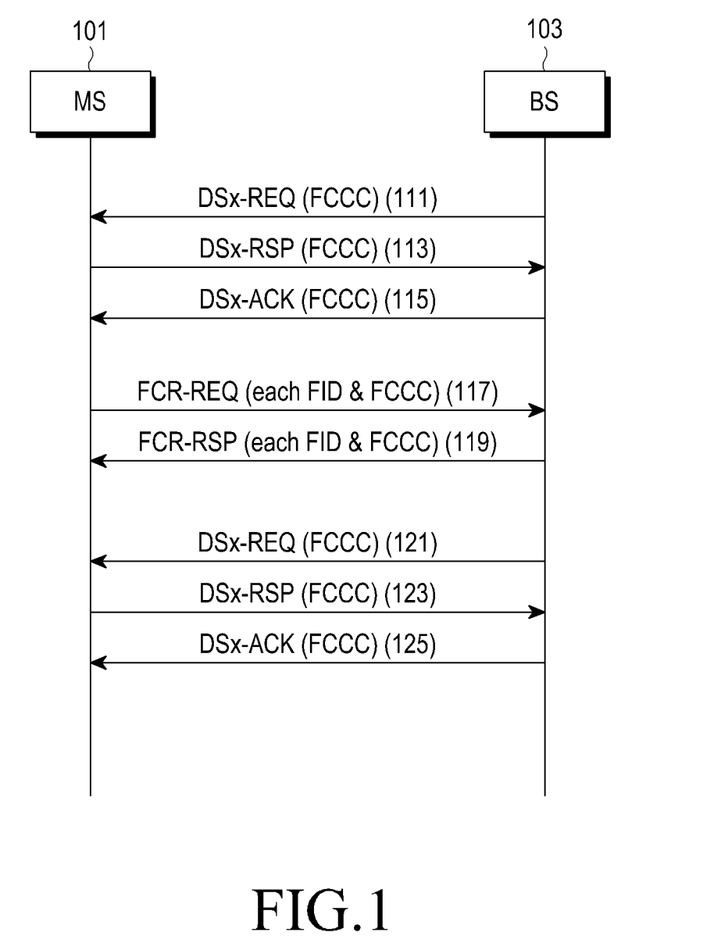
FIG. 1 is a signal flow diagram illustrating an operation for Flow Change Configuration Count (FCCC) value accordance between a Mobile Station (MS) and a Base Station (BS) according to a first exemplary embodiment of the present invention.

FIG. 1 is a signal flow diagram illustrating an operation for FCCC value accordance between an MS and a BS according to a first exemplary embodiment of the present invention.

Referring to FIG. 1, a BS 103 transmits a Dynamic Service Addition/Change/Deletion (DSx) REQuest (DSx-REQ) message for requesting an operation for an addition/change/deletion of flow information of each flow allocated to an MS 101 to the MS 101 in step 111, and then proceeds to step 113. The DSx-REQ message includes a Flow IDentifier (FID) of each corresponding flow and an FCCC indicating a current count of a number of times of the operation for the addition/change/deletion of the flow information of each FID. For example, it is assumed that when a flow having an FID of "3" is newly added, a value of 1 is assigned as an FCCC value of flow information of the flow having the FID of "3". In this case, in step 113, the MS 101 performs the operation for the addition/change/deletion of the flow information of a corresponding flow in accordance with the DSx-REQ message and transmits a DSx Response (DSx-RSP) message including an updated FCCC value indicating a result of the operation for the addition/change/deletion of the flow information to the BS 103, and then proceeds to step 115. For example, when the DSx-REQ message requests a configuration change of the flow of the FID, the MS 101 may indicate a changed FCCC value by allocating a value of "2" in order to indicate that the count of the addition/change/deletion operation has increased by 1, to the FCCC value of the FID.

In step 115, the BS 103 transmits a DSx ACKnowledgment (DSx-ACK) message reporting reception of the DSx-RSP message to the MS 101. The DSx-RSP message includes the updated FCCC value relating to flow information of a corresponding flow.

By repeatedly performing steps 111 through 115, the MS 101 and the BS 103 perform the operation for the addition/change/deletion of flow information of corresponding flows and store a flow configuration value for each performed operation, as expressed by an FCCC value.

Thereafter, in step 117, the MS 101 transmits an FCR-REQ message for determining if the FCCC values possessed by the MS 101 and the BS 103 are in accordance with each other to the BS 103. The FCR-REQ message includes FIDs currently possessed by the MS 101 and FCCC values of the FIDs. In step 119, the BS 103 transmits an FCR-RSP message, wherein the FCR-RSP message includes FIDs currently maintained by the BS 103 and FCCC values of the FIDs, to the MS 101. Here, it is assumed that the FCR-RSP message transmitted by the BS 103 includes an FID of 3 (FID=3) and an FCCC of 2 (FCCC=2).

When it is identified, through transmission and reception of the FCR-REQ message and the FCR-RSP message, that there are discordant FIDs among FCCC values of flows corresponding to FIDs between the MS 101 and the BS 103, the MS 101 and the BS 103 transmit and receive DSx-REQ, DSx-RSP, or the DSx-ACK messages for flow configuration for flow information of a flow corresponding to the discordant FIDs in steps 121 through 125. As a result, the MS 101 and the BS 103 can make FCCC values of the discordant FIDs to be in accordance with each other.

Figure 2:
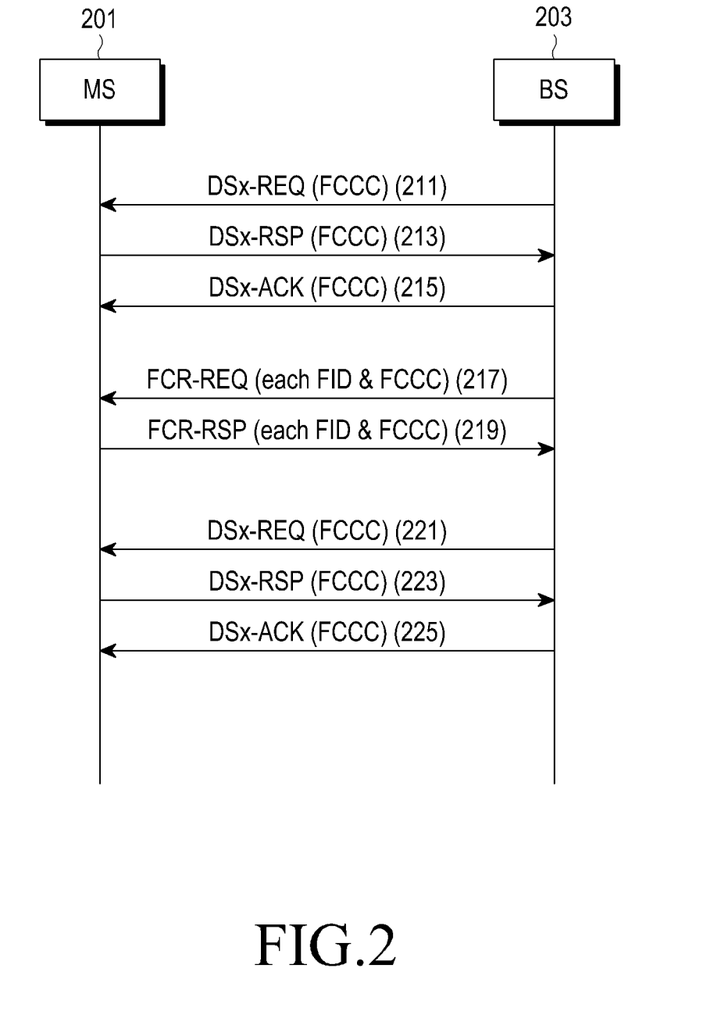
FIG. 2 is a signal flow diagram illustrating an operation for FCCC value accordance between an MS and a BS according to a second exemplary embodiment of the present invention.

FIG. 2 is a signal flow diagram illustrating an operation for FCCC value accordance between an MS and a BS according to a second exemplary embodiment of the present invention.

Referring to FIG. 2, in step 211, a BS 203 transmits a DSx-REQ message for requesting an operation for an addition/change/deletion of flow information of each flow allocated to the MS 201 to the MS 201. The DSx-REQ message includes an FID of a corresponding flow and an FCCC for the flow information of the FID. In step 213, the MS 201 performs the operation for the addition/change/deletion of flow information of a corresponding flow in accordance with the DSx-REQ message and transmits a DSx-RSP message including an updated FCCC value indicating a result of the operation for the addition/change/deletion of flow information to the BS 203. In step 215, the BS 203 transmits a DSx-ACK message reporting reception of the DSx-RSP message to the MS 201. The DSx-ACK message includes the updated FCCC value relating to flow information of a corresponding flow.

By repeatedly performing steps 211 through 215, the MS 201 and the BS 203 can perform the operation for the addition/change/deletion of flow information of corresponding flows, and set and store an FCCC value for each operation.

Thereafter, in step 217, the BS 203 transmits an FCR-REQ message for determining if the FCCC value held by the BS 203 is in accordance with the FCCC value held by the MS 201 to the MS 201. The FCR-REQ message includes FIDs currently held by the BS 203 and FCCC values of the currently held FIDs.

In step 219, the MS 201 transmits an FCR-RSP message, which includes FIDs currently possessed by the MS 201 and FCCC values of the FIDs, to the BS 203.

When it is identified, through transmission and reception of the FCR-REQ message and the FCR-RSP message, that there are discordant FIDs with discordant FCCC values of flows corresponding to the discordant FIDs, the MS 201 and the BS 203 transmit and receive DSx-REQ, DSx-RSP, and DSx-ACK messages for flow configuration for flow information of a flow corresponding to the discordant FIDs in steps 221 through 225. As a result, the MS 201 and the BS 203 can change the discordant FCCC values of the discordant FIDs to be in accordance with each other.

Figure 3:
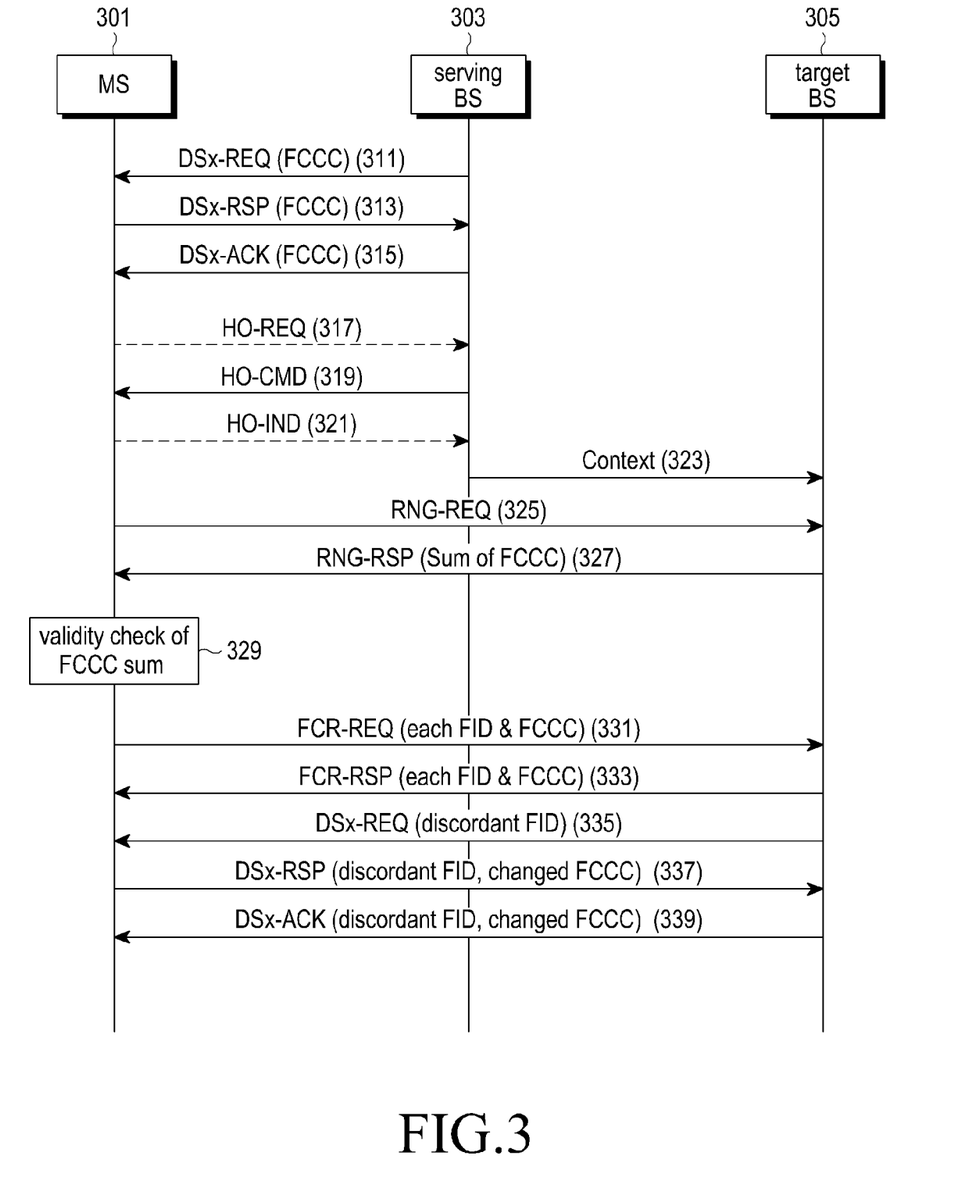
FIG. 3 is a signal flow diagram illustrating an operation for FCCC value accordance between an MS and a BS at a time of handover according to a third exemplary embodiment of the present invention.

FIG. 3 is a signal flow diagram illustrating an operation for FCCC value accordance between an MS and a BS at a time of handover according to a third exemplary embodiment of the present invention.

Referring to FIG. 3, a serving BS 303 transmits a DSx-REQ message, for requesting an operation for an addition/change/deletion of flow information of each flow allocated to the MS 301, to an MS 301 in step 311, and then proceeds to step 313. The DSx-REQ message includes an FID of a corresponding flow and an FCCC for the flow information of the FID. In step 313, the MS 301 performs the operation for the addition/change/deletion of flow information of a corresponding flow in accordance with the DSx-REQ message, configures an updated FCCC value indicating a result of the addition/change/deletion operation, and transmits a DSx-RSP message, including the updated FCCC value, to the serving BS 303. In step 315, the serving BS 303 transmits a DSx-ACK message in order to report reception of the DSx-RSP message to the MS 301. The DSx-ACK message includes the updated FCCC value relating to flow information of a corresponding flow.

In step 317, the MS 301 transmits a Handover Request (HO-REQ) message for handover of the MS 301 to a target BS 305 to the serving BS 303. In step 319, the serving BS 303 transmits a Handover Command (HO-CMD) message for handover of the MS 301 to the target BS 305 to the MS 301. In step 321, the MS 301 transmits a Handover Indication (HO-IND) message for handover to the target BS 305 to the serving BS 303. Upon receiving the HO-ND message, the serving BS 303 transmits context information of the MS 303 to the target BS 305 in step 323. The context information of the MS 303 includes an FID value of flow information of each flow allocated to the MS 301 and an FCCC value of each FID value.

In step 325, the MS 301 transmits a Ranging Request (RNG-REQ) message for an initial entry to the target BS 305. Upon receiving the RNG-REQ message, the BS 305 transmits a Ranging Response (RNG-RSP) message to the MS 301 in step 327. The RNG-RSP message includes a sum of FCCC values of FIDs of the MS 301 received from the serving BS 303 in step 323.

In step 329, the MS 301 determines if a sum of the FCCC values received from the target BS 305 is valid, that is, if the sum of the FCCC values received from the target BS 305 is identical to a sum of FCCC values held by the MS 301. As a result of the determination, when the sum of the FCCC values received from the target BS 305 does not coincide with the sum of FCCC values held by the MS 301, which implies that sum of the FCCC values received from the target BS 305 is not valid, the MS 301 transmits an FCR-REQ message, which includes FIDs currently held by the MS 301 and FCCC values of the FIDs, to the target BS 305 in step 331. Upon receiving the FCR-REQ message, the target BS 305 transmits an FCR-RSP message, which includes FIDs received from the serving BS 303 and FCCC values of the FIDs, to the MS 301 in step 333.

Thereafter, by transmitting and receiving the FCR-REQ message and the FCR-RSP message, the MS 301 and the target BS 305 determine if there is an FID having an FCCC value which does not coincide with any of the FCCC values held by the MS 301 and the target BS 305. As a result of the determination, when there is an FID having an FCCC value, which does not coincide with any of the held FCCC values, the target BS 305 transmits a DSx-REQ message for requesting an operation for an addition/change/deletion for a flow of the discordant FID to the MS 301 in step 335. The DSx-REQ message includes the discordant FID. In step 337, the MS 301 performs the operation for the addition/change/deletion of flow information in accordance with the DSx-REQ message and transmits a DSx-RSP message, which includes an updated FCCC value indicating a result of the operation for the addition/change/deletion of flow information and the discordant FID, to the target BS 305. In step 339, the target BS 305 receives the DSx-RSP message and transmits a DSx-ACK message, which indicates that the FCCC value of the discordant FID has been updated to an accordant value, to the MS 301. The DSx-ACK message includes the discordant FID and the updated FCCC value.

Figure 4:
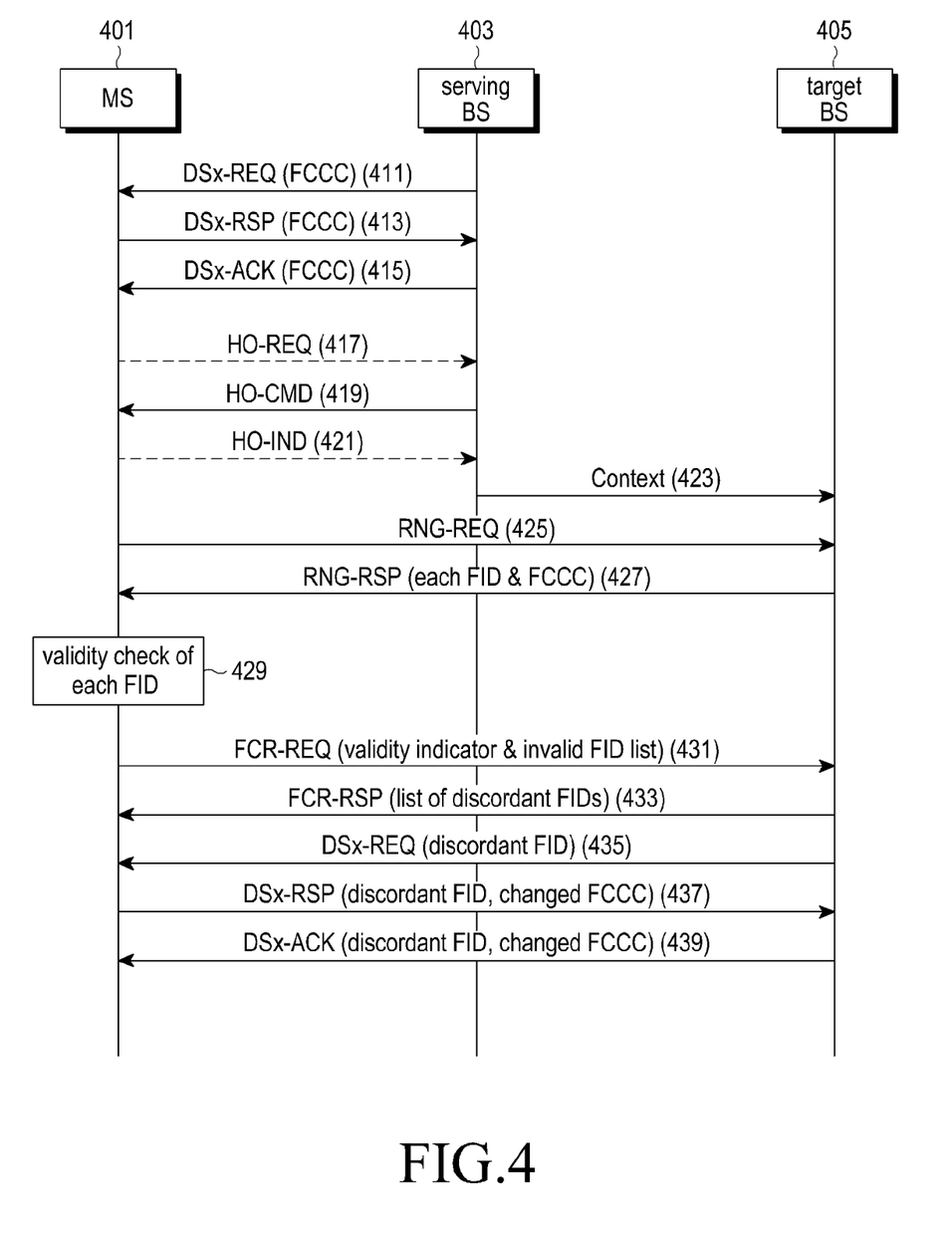
FIG. 4 is a signal flow diagram illustrating an operation for FCCC value accordance between an MS and a BS at a time of handover according to a fourth exemplary embodiment of the present invention.

FIG. 4 is a signal flow diagram illustrating an operation for FCCC value accordance between an MS and a BS at a time of handover according to a fourth exemplary embodiment of the present invention.

Referring to FIG. 4, a serving BS 403 transmits a DSx-REQ message, for requesting an operation for an addition/change/deletion of flow information of each flow allocated to the MS 401, to the MS 401 in step 411, and then proceeds to step 413. The DSx-REQ message includes an FID of a corresponding flow and an FCCC for the flow information of the FID. In step 413, the MS 401 performs an addition/change/deletion operation of flow information of a corresponding flow in accordance with the DSx-REQ message, configures an updated FCCC value indicating a result of the addition/change/deletion operation, and transmits a DSx-RSP message, including the updated FCCC value, to the BS 403. In step 415, the serving BS 403 transmits a DSx-ACK message reporting reception of the DSx-RSP message to the MS 401. The DSx-ACK message includes the updated FCCC value relating to flow information of a corresponding flow.

In step 417, the MS 401 transmits an HO-REQ message for handover of the MS 401 to the target BS 405 to the serving BS 403. In step 419, the serving BS 403 transmits an HO-CMD message for handover to the target BS 405 to the MS 401. In step 421, the MS 401 transmits an HO-IND message for handover to the target BS 405 to the serving BS 403. Upon receiving the HO-IND message, the serving BS 403 transmits context information of the MS 403 to the target BS 405 in step 423. The context information of the MS 403 includes an FID value of flow information of each flow allocated to the MS 401 and an FCCC value of each FID, which are held by the serving BS 403.

In step 425, the MS 401 transmits an RNG-REQ message for an initial entry to the target BS 405. Upon receiving the RNG-REQ message, the BS 405 transmits an RNG-RSP message to the MS 401 in step 427. The RNG-RSP message includes FIDs of the MS 401 received from the serving BS 403 and FCCC values of the FIDs.

In step 429, the MS 401 determines if an FCCC value of each FID received from the target BS 405 coincides with an FCCC value of each FID held by the MS 401. As a result of the determination, when the FCCC values received from the target BS 405 include an FCCC value which does not coincide with any of the FCCC values of the FIDs held by the MS 401, the MS 401 sets a validity indicator to a value of "1" in order to indicate that the FCCC values held by the target BS 405 are not valid. In contrast, when the FCCC values received from the target BS 405 completely coincide with the FCCC values held by the MS 401, the MS 401 sets the validity indicator to a value of "0" in order to indicate that the FCCC values possessed by the target BS 405 are valid.

In step 431, the MS 401 transmits an FCR-REQ message, which includes a validity indicator set based on a result of the determination as described above, to the target BS 405. When the validity indicator has been set to "1" in the FCR-REQ message, the FCR-REQ message further includes a list of invalid FIDs having FCCC values which have been identified as discordant as a result of the determination. Upon receiving the FCR-REQ message, the target BS 405 transmits an FCR-RSP message, which includes the discordant FCCC values included in the FID list, to the MS 401 in step 433.

In step 435, the target BS 405 transmits a DSx-REQ message for requesting an operation for an addition/change/deletion of flow information of a flow of the discordant FID to the MS 401. The DSx-REQ message includes the discordant FID. In step 437, the MS 401 performs a flow addition/change/deletion for the flow configuration of the discordant FID in accordance with the DSx-REQ message, and transmits a DSx-RSP message, which includes an updated FCCC value indicating a result of the flow addition/change/deletion and the discordant FID, to the target BS 405. In step 439, the target BS 405 receives the DSx-RSP message and transmits a DSx-ACK message, which indicates that the FCCC value of the discordant FID has been updated to an accordant value, to the MS 401. The DSx-ACK message includes the discordant FID and the updated FCCC value.

Figure 5:
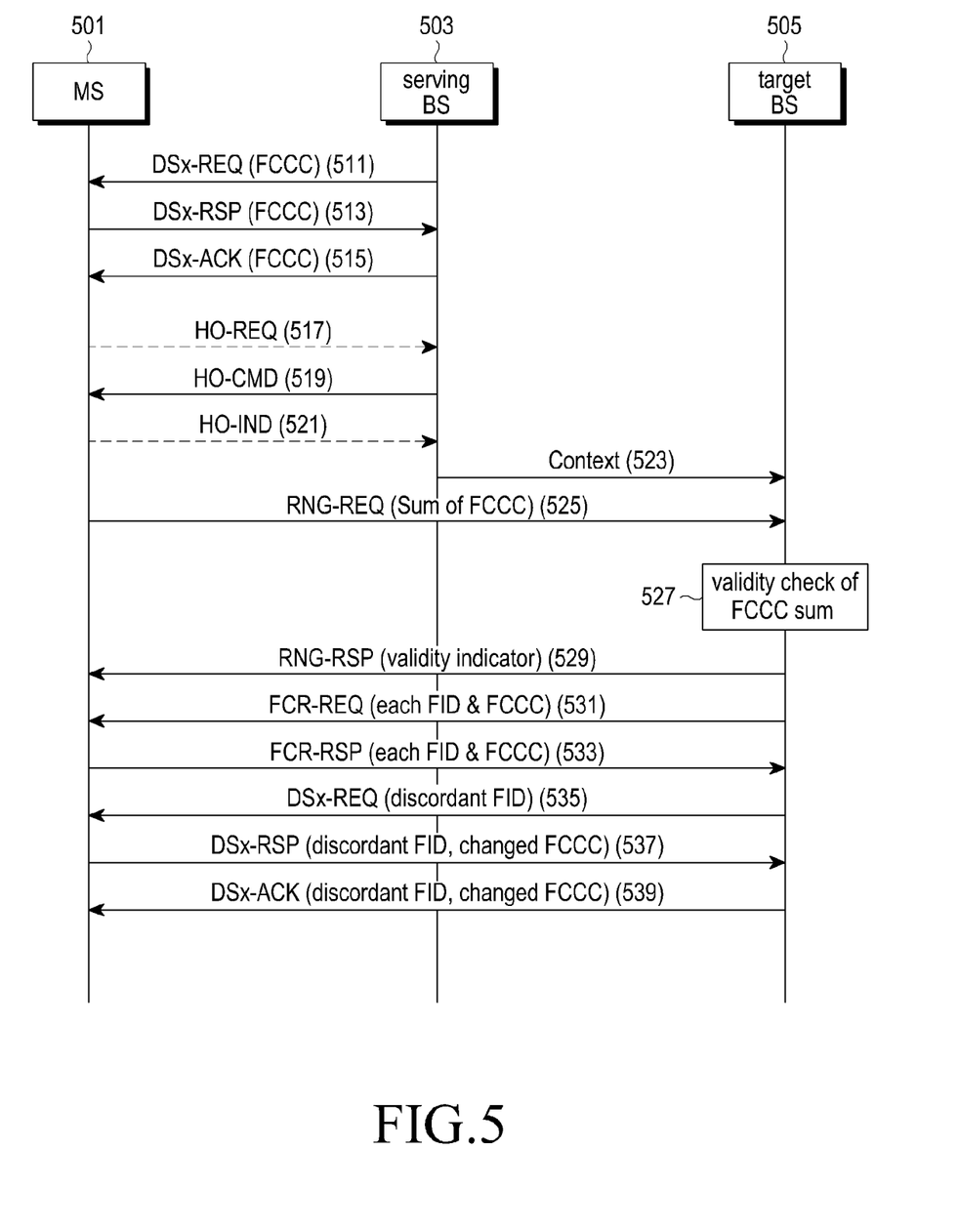
FIG. 5 is a signal flow diagram illustrating an operation for FCCC value accordance between an MS and a BS at a time of handover according to a fifth exemplary embodiment of the present invention.

FIG. 5 is a signal flow diagram illustrating an operation for FCCC value accordance between an MS and a BS at a time of handover according to a fifth exemplary embodiment of the present invention.

Referring to FIG. 5, in step 511, a serving BS 503 transmits a DSx-REQ message for requesting an addition/change/deletion operation of flow information of each of flows allocated to an MS 501 to the MS 501, and then proceeds to step 513. The DSx-REQ message includes an FID of a corresponding flow and an FCCC for the flow information of the FID. In step 513, the MS 501 performs an operation for an addition/change/deletion of flow information of a corresponding flow in accordance with the DSx-REQ message, configures an updated FCCC value indicating a result of the addition/change/deletion operation, and transmits a DSx-RSP message including the updated FCCC value to the BS 503. In step 515, the serving BS 503 transmits a DSx-ACK message reporting reception of the DSx-RSP message to the MS 501. The DSx-ACK message includes the updated FCCC value.

In step 517, the MS 501 transmits an HO-REQ message for handover of the MS 501 to the target BS 505 to the serving BS 503. In step 519, the serving BS 503 transmits an HO-CMD message for handover to the target BS 505 to the MS 501. In step 521, the MS 501 transmits an HO-IND message for handover to the target BS 505 to the serving BS 503. Upon receiving the HO-IND message, the serving BS 503 transmits context information of the MS 503 to the target BS 505 in step 523. The context information of the MS 503 includes an FID value of flow information of each flow allocated to the MS 501 and an FCCC value of each FID, which are held by the serving BS 503.

In step 525, the MS 501 transmits an RNG-REQ message for an initial entry to the target BS 505. The RNG-REQ message includes a sum of FCCC values of FIDs held or stored by the MS 503 at the time of step 523. Upon receiving the RNG-REQ message, the target BS 505, in step 527, determines if the sum of the FCCC values received from the MS 501 is valid by determining if they are in accordance with a sum of FCCC values held by the target BS 505 itself, which is a sum of FCCC values acquired from the serving BS 503, and then proceeds to step 529. As a result of the determination, when the sum of the FCCC values received from the MS 501 does not coincide with the sum of FCCC values possessed by the target BS 505 itself, the target BS 505 sets a validity indicator to a value of "1" in order to indicate that the sum of the FCCC values held by the target BS 505 is not valid. In contrast, when the sum of the FCCC values received from the MS 501 coincides with the sum of FCCC values held by the target BS 505 itself, the target BS 505 sets the validity indicator to a value of "0" in order to indicate that the sum of the FCCC values possessed by the target BS 505 is valid.

In step 529, the target BS 505 transmits an RNG-RSP message, which includes the validity indicator set according to the result of the determination as described above, to the MS 501, and then proceeds to step 531.

As a result of the determination in step 527, when the validity indicator has been set to "1", the target BS 505, in step 531, transmits an FCR-REQ message, which includes FIDs stored in the target BS 505 and FCCC values of the FIDs, to the MS 501. Upon receiving the FCR-REQ message, the MS 501 transmits an FCR-RSP message, which includes the FIDs stored in the MS 501 and FCCC values of the FIDs, to the target BS 505 in step 533.

Thereafter, by transmitting and receiving the FCR-REQ message and the FCR-RSP message, the MS 501 and the target BS 505 determine if there is an FID having an FCCC value which does not coincide with any of the FCCC values held by the MS 501 and the target BS 505. As a result of the determination, when there is an FID having an FCCC value, which does not coincide with any of the possessed FCCC values, the target BS 505, in step 535, transmits a DSx-REQ message for requesting an operation for an addition/change/deletion for a flow of the discordant FID to the MS 501. The DSx-REQ message includes the discordant FID. In step 537, the MS 501 performs the operation for the addition/change/deletion of the flow information for the discordant FID in accordance with the DSx-REQ message and transmits a DSx-RSP message, which includes an updated FCCC value indicating a result of the operation for the addition/change/deletion of flow information and the discordant FID, to the target BS 505. In step 539, the target BS 505 receives the DSx-RSP message and transmits a DSx-ACK message, which notifies that the FCCC value of the discordant FID has been updated to an accordant value, to the MS 501. The DSx-ACK message includes the discordant FID and the updated FCCC value.

Figure 6:
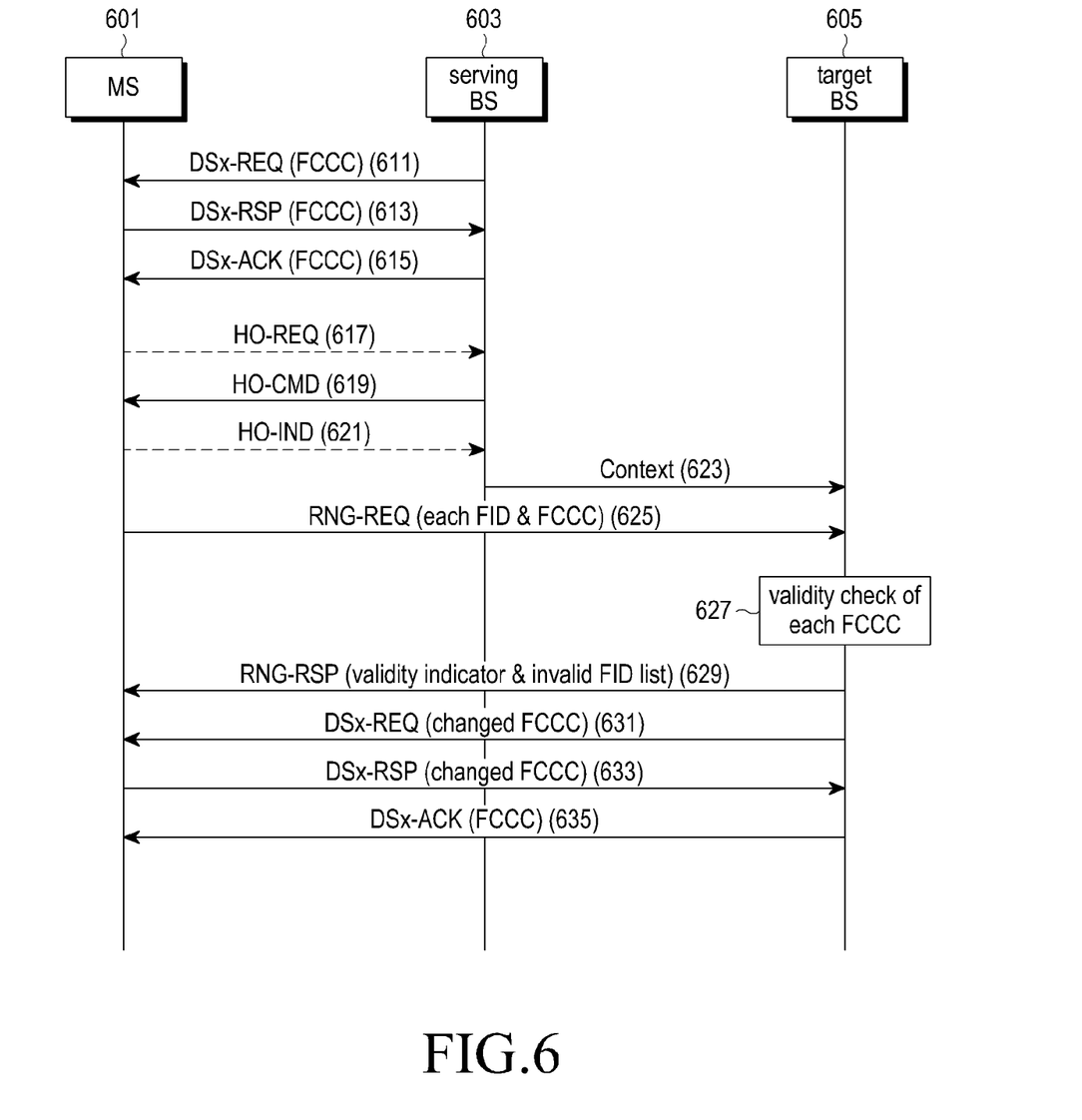
FIG. 6 is a signal flow diagram illustrating an operation for FCCC value accordance between an MS and a BS at a time of handover according to a sixth exemplary embodiment of the present invention.

FIG. 6 is a signal flow diagram illustrating an operation for FCCC value accordance between an MS and a BS at a time of handover according to a sixth exemplary embodiment of the present invention.

Referring to FIG. 6, in step 611, a serving BS 603 transmits a DSx-REQ message for requesting an addition/change/deletion operation of flow information of each of flows allocated to the MS 601 to the MS 601, and then proceeds to step 613. The DSx-REQ message includes an FID of a corresponding flow and an FCCC for the flow information of the FID. In step 613, the MS 601 performs an addition/change/deletion operation of flow information of a corresponding flow in accordance with the DSx-REQ message, and transmits a DSx-RSP message, which includes an updated FCCC value indicating a result of the addition/change/deletion operation, to the BS 603. In step 615, the serving BS 603 transmits a DSx-ACK message reporting reception of the DSx-RSP message to the MS 601. The DSx-ACK message includes the updated FCCC value.

In step 617, the MS 601 transmits an HO-REQ message for handover of the MS 601 to the target BS 605 to the serving BS 603. In step 619, the serving BS 603 transmits an HO-CMD message for handover to the target BS 605 to the MS 601. In step 621, the MS 601 transmits an HO-IND message for handover to the target BS 605 to the serving BS 603. Upon receiving the HO-IND message, the serving BS 603 transmits context information of the MS 603 to the target BS 605 in step 623. The context information of the MS 603 includes an FID value of flow information of each flow allocated to the MS 601 and an FCCC value of each FID, which are held by the serving BS 603.

In step 625, the MS 601 transmits an RNG-REQ message for an initial entry to the target BS 605. The RNG-REQ message includes FIDs of flows and FCCC values of the FIDs stored by the MS 603.

Upon receiving the RNG-REQ message, the target BS 605, in step 627, determines if each of the FCCC values received from the MS 601 coincides with any of FCCC values acquired from the serving BS 603, and then proceeds to step 629. As a result of the determination, when the FCCC values received from the MS 601 includes an FCCC value that does not coincide with any of the FCCC values acquired from the serving BS 603, the target BS 605, in step 629, sets a validity indicator to a value of "1" indicating that the FCCC values held by the target BS 605 are not valid. In contrast, when the FCCC values received from the MS 601 completely coincide with the FCCC values acquired from the serving BS 603, the target BS 605 sets the validity indicator to a value of "0", which indicates that the FCCC values held by the target BS 605 are valid.

In step 629, the target BS 605 transmits an RNG-RSP message to the MS 601. The RNG-RSP message includes the validity indicator set according to a result of the determination as described above. When the validity indicator has been set to "1", the RNG-RSP message further includes a list of FIDs having FCCC values which have been identified as discordant as a result of the determination.

In step 631, the target BS 605 transmits a DSx-REQ message for requesting an operation for addition/change/deletion of flow information of FIDs having the discordant FCCC values to the MS 601. In step 633, the MS 601 performs a flow addition/change/deletion for the flows of the discordant FIDs in accordance with the DSx-REQ message, and transmits a DSx-RSP message, which includes an updated FCCC value indicating a result of the flow addition/change/deletion, to the target BS 605. For example, the DSx-REQ message may include FIDs having the discordant FCCC values, so as to notify the BS 605 of the FIDs to be added/changed/deleted. However, according to aspects of the present invention, the operation of notifying the target BS 605 of the FIDs to be added/changed/deleted is not limited to the exemplary embodiment.

In step 635, the target BS 605 receives the DSx-RSP message and transmits a DSx-ACK message, which notifies that the FCCC values of the discordant FIDs have been updated to accordant values, to the MS 601. The DSx-ACK message includes the discordant FIDs and the updated FCCC values.

Figure 7:
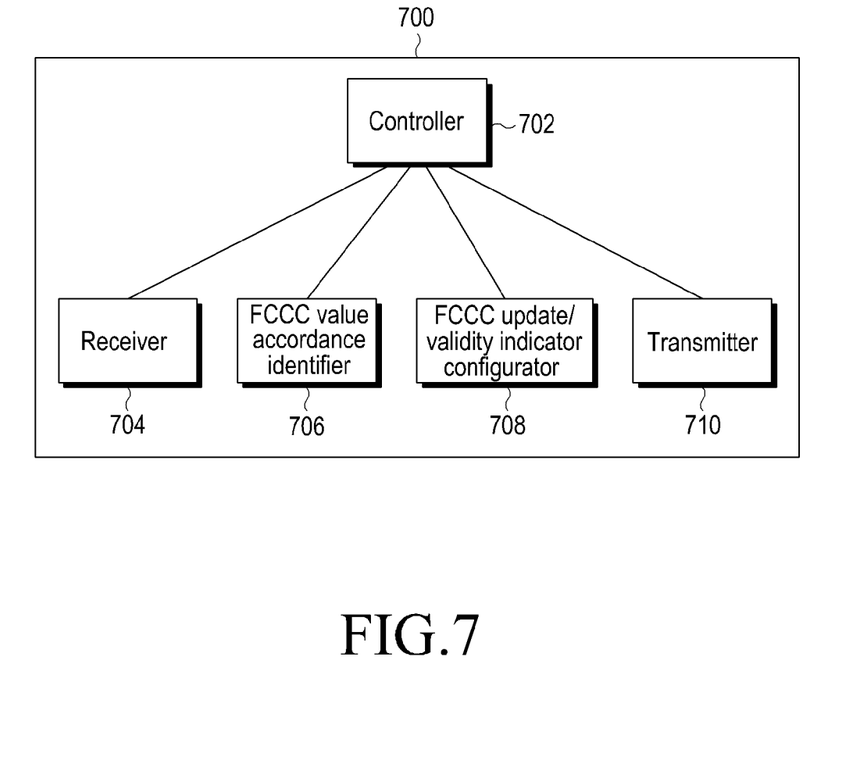
FIG. 7 is a block diagram illustrating a structure of an apparatus for FCCC value accordance between an MS and a BS according to an exemplary embodiment of the present invention.

FIG. 7 is a block diagram illustrating a structure of an apparatus for FCCC value accordance between an MS and a BS according to an exemplary embodiment of the present invention. It is assumed that elements included in the apparatus 700 shown in FIG. 7 can perform corresponding operations according to the first through sixth exemplary embodiments of the present invention. Therefore, it is assumed that the apparatus 700 can operate as any of the serving BS, the target BS, or the MS according to a corresponding embodiment.

Referring to FIG. 7, the apparatus 700 includes a controller 702, a receiver 704, an FCCC value accordance identifier 706, an FCCC update/validity indicator configurator 708, and a transmitter 710.

The receiver 704 receives DSx-REQ/RSP/ACK messages and FCR-REQ/RSP/ACK messages. The DSx-REQ/RSP/ACK messages include an FCCC stored by the transmitting side, and the FCR-REQ/RSP/ACK messages include a corresponding FID and an FCCC value of the FID according to an embodiment of the present invention. Furthermore, the receiver 704 receives RNG-REQ/RSP/ACK messages. The RNG-REQ/RSP/ACK messages include a validity indicator or a sum of FCCC values stored in the transmitting side.

The controller 702 acquires an FID and an FCCC value or a sum of FCCC values and transfers the acquired information to the FCCC value accordance identifier 706. The FCCC value accordance identifier 706 determines if a currently stored FCCC values coincide with FCCC values received from the receiver 704.

The controller 702 transfers a result of the determination by the FCCC value accordance identifier 706 to the FCCC update/validity indicator configurator 708. As a result of the determination, when the currently stored FCCC values completely coincide with the FCCC values received from the receiver 704, the FCCC update/validity indicator configurator 708 sets a validity indicator to "0". In contrast, as a result of the determination, when there is a discordant FCCC value, the FCCC update/validity indicator configurator 708 sets the validity indicator to "1".

Furthermore, as a result of the determination, when there is a discordant FCCC value, the FCCC update/validity indicator configurator 708 updates the discordant FCCC value through DSx-REQ/RSP/ACK messages, which are transmitted and received for flow configuration for flow information of a flow corresponding to an FID having the discordant FCCC value.

The controller 702 controls the transmitter 710 to make the transmitter 710 transmit DSx-REQ/RSP/ACK messages, which include the updated FCCC value or the configured validity indicator according to a corresponding embodiment of the present invention, to a receiving side. When the apparatus 700 operates as described with reference to the fifth or sixth exemplary embodiment of the present invention, the controller 702 controls the transmitter 710 to make the transmitter 710 transmit an RNG-/RSP message, including the validity indicator, to a receiving side. When the validity indicator is "1", the controller 702, according to the fifth exemplary embodiment of the present invention, inserts FIDs stored by the controller 702 itself and FCCC values of the FIDs in the RNG-/RSP message. Further, the controller 702 according to the sixth exemplary embodiment of the present invention inserts a list of FIDs having FCCC values discordant with the received FCCC values in the RNG-/RSP message.

According to exemplary embodiments of the present invention, the BS and the MS transmit and receive FCCC values, which indicate a number of times of an operation for an addition/change/deletion of flow information of flows held by the BS and the MS. The BS and the MS also determine if the FCCC values coincide between the BS and the MS, and update discordant FCCC values to be in accordance with each other, thereby preventing mis-operation of the MS and the BS and improving communication between the MS and the BS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing flow information of a mobile station by a target base station in a communication system, the method comprising:

receiving a ranging request message, which includes a flow identifier for each of flows between a serving base station and the mobile station and a change count indicating the number of times of an addition/change/deletion operation of a corresponding flow for each of flow identifiers, from the mobile station; and transmitting a ranging response message, which includes a validity indicator indicating whether the change count of each of the flow identifiers is valid or not, to the mobile station, wherein, when the validity indicator indicates that at least one change count among change counts for each of the flow identifiers is not valid, the ranging response message comprises a list including the at least one change count that is not valid.

2. The method of claim 1, wherein the transmitting of the ranging response message comprises:

when change counts for each of the flow identifiers completely coincide with change counts stored in the target base station, configuring the validity indicator to indicate that all the change counts for each of the flow identifiers are valid; and when the change counts for each of the flow identifiers include at least one change count which does not coincide with any of the change counts stored in the target base station, configuring the validity indicator to indicate that the change counts for each of the flow identifiers include at least one invalid change count.

3. The method of claim 2, further comprising performing the addition/change/deletion operation of the corresponding flow for each of the flow identifiers having an invalid change count, thereby deleting the invalid change count.

4. The method of claim 2, further comprising before the configuring of the validity indicator, receiving a change count stored for each of the flow identifiers from the serving base station.

5. A method for managing flow information by a mobile station in a communication system, the method comprising:

transmitting a ranging request message, which includes a flow identifier for each of flows connected to a serving base station and a change count indicating the number of times of an addition/change/deletion operation of a corresponding flow for each of flow identifiers; and receiving a ranging response message, which includes a validity indicator indicating whether the change count of each of the flow identifiers is valid or not, from a target base station, wherein, when the validity indicator indicates that at least one change count for each of the flow identifiers is not valid, the ranging response message comprises a list including the at least one change count that is not valid.

6. The method of claim 5, wherein the receiving of the ranging response message comprises:

when change counts for each of the flow identifiers completely coincide with change counts stored in the target base station, receiving the validity indicator indicating that all the change counts for each of the flow identifiers are valid; and when the change count for each of the flow identifiers include at least one change count which does not coincide with any of the change counts stored in the target base station, receiving the validity indicator indicating that the change counts for each of the flow identifiers include at least one invalid change count.

7. The method of claim 6, further comprising acquiring a change count stored in the target base station for a flow corresponding to a flow identifier having the invalid change count from the serving base station.

8. A target base station for managing flow information of a mobile station in a communication system, the target base station comprising:
   a receiver for receiving a ranging request message, which includes a flow identifier for each of flows between a serving base station and the mobile station and a change count indicating the number of times an addition/change/deletion operation of a corresponding flow for each of flow identifiers, from the mobile station; and
   a transmitter for transmitting a ranging response message, which includes a validity indicator indicating whether the change count for each of the flow identifiers is valid or not, to the mobile station; and
   a controller for, when the validity indicator indicates that at least one change count among change counts for each of the flow identifiers is not valid, inserting a list including the at least one change count in the ranging response message.

9. The target base station of claim 8, wherein the controller configures the validity indicator to indicate that all change counts of the flow identifiers are valid when the change counts for each of the flow identifiers completely coincide with change counts stored in the target base station, and
   wherein the controller configures the validity indicator to indicate that the change counts for each of the flow identifiers include at least one invalid change count when the change counts for each of the flow identifiers include at least one change count which does not coincide with any of the change counts stored in the target base station.

10. The target base station of claim 9, wherein the controller performs the addition/change/deletion operation of the corresponding flow for each of the flow identifiers having an invalid change count in order to delete the invalid change count.

11. The target base station of claim 9, wherein the receiver receives a change count stored for each of the flow identifiers from the serving base station before the validity indicator is configured.

12. A mobile station for managing flow information in a communication system, the mobile station comprising:
   a transmitter for transmitting a ranging request message, which includes a flow identifier for each of flows connected to a serving base station and a change count indicating a number of times of an addition/change/deletion operation of a corresponding flow for each of flow identifiers, to a target base station; and
   a receiver for receiving a ranging response message, which includes a validity indicator indicating whether the change count for each of the flow identifiers is valid or not, from the target base station,
   wherein, when the validity indicator indicates that at least one change count for each of the flow identifiers is not valid, the ranging response message comprises a list including the at least one change count that is not valid.

13. The mobile station of claim 12, wherein the receiver receives the validity indicator configured to indicate that all change counts of the flow identifiers are valid when the change counts for each of the flow identifiers completely coincide with change counts stored in the target base station, and
   wherein the receiver receives the validity indicator configured to indicate that the change counts for each of the flow identifiers include at least one invalid change count when the change counts for each of the flow identifiers include at least one change count which does not coincide with any of the change counts stored in the target base station.

14. The mobile station of claim 13, wherein the receiver acquires a change count stored in the target base station for a flow corresponding to a flow identifier having the invalid change count, from the serving base station.

* * * * *